United States Patent
Gebert et al.

(10) Patent No.: US 11,402,019 B2
(45) Date of Patent: Aug. 2, 2022

(54) PARKING LOCK ARRANGEMENT

(71) Applicant: FTE automotive GmbH, Ebern (DE)

(72) Inventors: Stefan Gebert, Ebern (DE); Lothar Hein, Ebern (DE); Rudolf Graner, Ebern (DE); Egid Macht, Ebern (DE)

(73) Assignee: FTE automotive GmbH, Ebern (DE)

( * ) Notice: Subject to any disclaimer, the term of this patent is extended or adjusted under 35 U.S.C. 154(b) by 109 days.

(21) Appl. No.: 16/845,136

(22) Filed: Apr. 10, 2020

(65) Prior Publication Data
US 2020/0332894 A1 Oct. 22, 2020

(30) Foreign Application Priority Data
Apr. 18, 2019 (DE) ...................... 10 2019 110 384.3

(51) Int. Cl.
| | |
|---|---|
| *F16H 63/34* | (2006.01) |
| *B60T 1/00* | (2006.01) |
| *F16H 63/38* | (2006.01) |

(52) U.S. Cl.
CPC .......... *F16H 63/3433* (2013.01); *B60T 1/005* (2013.01); *F16H 63/3441* (2013.01); *F16H 63/3475* (2013.01); *F16H 63/38* (2013.01)

(58) Field of Classification Search
CPC ............. F16H 63/3433; F16H 63/3483; F16H 63/3466; F16H 63/3475; F16H 63/3458; F16H 63/38; F16H 63/3441; F16H 63/3425; F16H 63/3416; F16D 2121/24; F16D 2127/06; B60T 1/005; B60T 1/062; H01F 2007/1669; H01F 2007/1692
See application file for complete search history.

(56) References Cited

U.S. PATENT DOCUMENTS

| | | | | |
|---|---|---|---|---|
| 6,513,638 | B2 * | 2/2003 | Thyselius | B60T 1/005 192/219.5 |
| 2015/0136535 | A1 | 5/2015 | Smeeton | |
| 2018/0154881 | A1 * | 6/2018 | Heubner | F16H 63/3441 |

FOREIGN PATENT DOCUMENTS

| | | |
|---|---|---|
| DE | 297 08 796 U1 | 8/1997 |
| DE | 10 2009 023 498 A1 | 12/2010 |

(Continued)

OTHER PUBLICATIONS

Sengupta, Pritimay. Espacenet machine translation of EP0877133. 1998. Espacenet. (Year: 1998).*

(Continued)

*Primary Examiner* — Ernesto A Suarez
*Assistant Examiner* — Lori Wu
(74) *Attorney, Agent, or Firm* — Oblon, McClelland, Maier & Neustadt, L.L.P.

(57) ABSTRACT

A parking lock arrangement for an electromotively driven motor vehicle, including a parking lock wheel which is rotationally conjoint with respect to a shaft in the drive train and which has multiple cutouts, a lock element which is movable between a locking position and a release position along a movement path and which, in the locking position, engages in a form-fitting manner into a cutout of the parking lock wheel and, in the release position, is out of engagement with the cutouts of the parking lock wheel, a parking lock actuator which is operatively connected to the lock element and wherein the lock element is adjustable between the locking position and the release position along its movement path. The movement path of the lock element can be rectilinear.

10 Claims, 4 Drawing Sheets

(56) References Cited

FOREIGN PATENT DOCUMENTS

| DE | 10 2007 010 940 B4 | 9/2013 | |
|----|---------------------|---------|---|
| DE | 10 2016 201 177 A1 | 7/2017 | |
| DE | 10 2017 114 937 A1 | 1/2019 | |
| DE | 102017121007 A1 * | 3/2019 | ......... F16H 63/3441 |
| DE | 102017125786 A1 * | 5/2019 | ........... H01F 7/1615 |
| EP | 0 877 133 A2 | 11/1998 | |
| EP | 2 163 792 A1 | 3/2010 | |
| EP | 2 847 047 A1 | 3/2015 | |
| WO | WO 2019/007452 A1 | 1/2019 | |

OTHER PUBLICATIONS

German Search Report dated Feb. 4, 2020, in German Application 10 2019 110 384.3 filed on Apr. 18, 2019 (with English Translation of Categories of Cited Documetns & Written Opinion), 8 pages.
Extended European Search Report dated Aug. 10, 2020 in Patent Application No. 20169630.9, 8 pages.

\* cited by examiner

PARKING LOCK ARRANGEMENT

BACKGROUND OF THE INVENTION

Field of the Invention

The present invention relates to a parking lock arrangement. A parking lock arrangement of said type that is intended for a motor vehicle with electric drive comprises a lock element, which interacts with a parking lock wheel, and a parking lock actuator, which serves for adjusting the lock element between a locking position and a release position. The parking lock arrangement is intended to prevent, in a locking position, the motor vehicle from inadvertently rolling away.

Description of the Related Art

In known parking lock arrangements, it is generally the case that the drive train is locked via a parking lock wheel which is arranged rotationally conjointly on a shaft of the drive train and which has a toothing and which, by means of a parking lock pawl mounted pivotably on a parallel axle and having a lock element in the form of a locking tooth, can be locked in a form-fitting manner at the toothing. Here, the parking lock pawl is preloaded by the force of a restoring spring either away from the parking lock wheel into an unlocked position or towards the parking lock wheel into the locking position. For the purpose of pivoting the parking lock pawl counter to the force of the restoring spring, besides hydraulic parking lock actuators, use may also be made of electrical or electromechanical parking lock actuators which serve for generating a linear movement, or an at least substantially linear movement, via which an actuation element is movable towards the parking lock pawl in order to pivot the latter.

Such parking lock arrangements are known from the prior art. In this regard, DE 10 2007 010 940 B4 discloses a parking lock arrangement having a lock element which is formed by a locking tooth of a rotatably mounted pawl which, by means of a control element which is movable back and forth in a substantially linear manner, is adjustable between a release position and a locking position which arrests a gearing. Here, the control element is actuated by an actuator which comprises two redundant electromagnets.

Document DE 10 2009 023 498 A1 discloses a parking lock arrangement of the type mentioned in the introduction for a motor vehicle with electric drive. Said parking lock arrangement comprises a sliding element which is movable in a translational manner by an actuator and which, via a conical pressure surface, interacts with a pivotably mounted pawl. The pawl has on the inside a locking tooth which can, as a lock element, be adjusted between a locking position and an unlocking position during a pivoting movement of the pawl along a circular movement path. In the locking position, the locking tooth engages in a form-fitting manner into one of multiple latching cutouts which are distributed over the circumference of a parking lock wheel. The parking lock wheel is connected rotationally conjointly to a shaft of the drive train of the motor vehicle, with the result, in the locking position of the pawl or in the locking position of the lock element, that the drive train is prevented from performing a rotational movement and thus the motor vehicle is prevented from rolling away. By contrast, in the unlocking position, selectively actuable via the actuator, of the pawl or in the associated release position of the lock element, this form-fitting engagement is eliminated, with the result that the components of the drive train can rotate freely.

BRIEF SUMMARY OF THE INVENTION

The present invention is based on the object of proposing a parking lock arrangement for an electromotively driven motor vehicle (also called electric vehicle) which is of the simplest possible design.

Said object is achieved by a parking lock arrangement according to the invention disclosed herein. Advantageous configurations and expedient refinements of the invention will emerge from the dependent claims, the description or the figures, wherein features described or shown here may, individually or in any desired combination with one another, constitute a subject of the invention, unless the context clearly indicates otherwise.

For a parking lock arrangement intended for a motor vehicle with electric drive and comprising the following:
- a parking lock wheel which has multiple cutouts distributed over its circumference and which is connected rotationally conjointly to a shaft in the drive train between the electric drive of the motor vehicle and driven wheels of the motor vehicle,
- a lock element which is movable between a locking position and a release position along a movement path and which, in the locking position, engages in a form-fitting manner into a cutout of the parking lock wheel and in this way blocks a rotational movement of the shaft which is rotationally conjoint with respect to the parking lock wheel and consequently also of the wheels, operatively connected to said shaft, of the motor vehicle, and which, in the release position, is not in engagement with the cutouts of the parking lock wheel, with the result that the shaft which is rotationally conjoint with respect to the parking lock wheel and the wheels, operatively connected to said shaft, of the motor vehicle are released, and
- a parking lock actuator for adjusting the lock element between the locking position and the release position along its movement path, it is provided according to the invention that the movement path of the lock element is rectilinear.

In other words, this means that the lock element is moved only in a translational manner between the locking position and the release position.

A major advantage in the embodiment according to the invention is that no parking lock pawl is required. Therefore, besides a particularly simple construction, the parking lock arrangement according to the invention is also distinguished especially by a compact design, which allows simple accommodation even with confined installation space conditions.

A further advantage is that, in this case, owing to the omission of a spring-loaded pawl, it is also possible for the parking lock actuator to be of particular simple design.

It is particularly advantageous if the lock element is a bar or cylindrical pin which is mounted in a frame or housing of the parking lock actuator and which is axially displaceable along its longitudinal extent. Here, the pin or bar may be mounted directly or indirectly, in particular via a rod fastened thereto. Preferably, the pin or a rod connected to the latter is, via slide bearings, mounted in an axially displaceable manner in a housing of the parking lock actuator.

Preferably, the parking lock actuator has a housing which is in particular of multi-part design and in which the lock element is mounted in an axially displaceable manner, wherein a free end of the lock element, at least in the locking position, projects from the housing and engages into a cutout of the parking lock wheel in a form-fitting manner outside the housing.

According to a particularly preferred embodiment, it is proposed that the cutouts in the parking lock wheel are formed in an axial direction, wherein the lock element is mounted so as to be displaceable parallel to the axis of rotation of the parking lock wheel and, in the locking position, engages axially into one of the cutouts. The axial cutouts may in this case also be formed as passage bores.

According to an alternative embodiment, it is proposed that the cutouts in the parking lock wheel are formed in a radial direction, wherein the lock element is mounted so as to be displaceable perpendicular to the axis of rotation of the parking lock wheel and, in the locking position, engages radially into one of the cutouts. Here, the cutouts, as in the case of the conventional parking locks operating with a pawl, are arranged in the outer circumference of the parking lock wheel in a manner similar to a toothed gear.

Preferably, the parking lock actuator is an electromechanical actuator.

According to a particularly preferred embodiment, it is proposed here that the parking lock actuator comprises an electromagnet in the form of a solenoid having a solenoid plunger which interacts with a coil, wherein the solenoid plunger is connected fixedly to the lock element or forms, with a sub-region thereof, the lock element. Thus, through electrical energization or absence of electrical energization of the axially fixed coil, the lock element can be adjusted between the locking position and the release position.

It is particularly advantageous here if the parking lock actuator comprises two axially adjacently arranged solenoids having in each case one coil, or a reversing solenoid acting in both directions and having two axially adjacently situated coils. In such double-acting solenoids, which are known per se, both coils can be electrically energized separately from one another in order, in this way, to adjust the lock element between the locking position and the release position.

For the purpose of securing the locking position and the release position, it is particularly expedient if provision is made of locking means which act in a form-fitting and/or force-fitting manner and by way of which the lock element can, in both positions, be fixed mechanically, in particular in a latching manner, in each case. Electrical energization of the coil(s) of the solenoid is then required only briefly for an adjustment of the lock element, while the lock element is securely mechanically held in the two positions, in each case even without electrical energization of the coil(s).

A particularly simple embodiment of the locking means is achieved here in that these comprise a locking body which is loaded by a compression spring, in particular a spring-loaded ball, which locking body, in the locking position and in the release position, engages, in each case in a latching manner, into a cutout, in particular into a spherical cap-shaped or spherical dome-shaped depression, which is connected fixedly to the lock element. Here, the compression spring is matched to the solenoid such that the holding force exerted by said compression spring can be overcome with the electrical energization of a coil. Alternatively, it is also possible for the locking means to comprise an additional electric magnet by way of which, with electrical energization, a spring-loaded locking body, for releasing the lock element, can be adjusted into an unlocking position.

According to an alternative embodiment, the electromechanical parking lock actuator comprises an electric motor whose output shaft is operatively connected to the lock element via a gearing mechanism, wherein the gearing mechanism serves to convert a rotational movement of the output shaft of the motor into an axial movement of the lock element. As an alternative to this, it is also possible for use to be made of an electric motor which generates, instead of a rotating movement, directly a translational movement and thus forms a linear drive.

It is particularly advantageous if at least one sensor, formed as an angle sensor, is arranged for position detection of the parking lock wheel. In this case, prior to the engagement of the parking lock, it is possible to detect whether one of the cutouts of the parking lock wheel is situated in front of the lock element such that the latter can be adjusted into the locking position easily, in particular without contact with the wall portions of the parking lock wheel that delimit the cutout. If the sensor detects a position of the parking lock wheel which differs from this state, the electric motor of the vehicle can firstly be activated by a control unit of the parking lock arrangement such that the parking lock wheel is rotated slightly into the desired position with a cutout oriented exactly to the lock element.

It is also expedient for one or two sensors to be provided in the parking lock arrangement for position detection of the lock element. By way of such displacement sensors, an indication can be made to a control unit of the parking lock arrangement as to whether the lock element is situated in the locking position or in the release position.

The present invention also relates to a motor vehicle with electric drive which comprises a parking lock arrangement of the above-described type. In this case, the motor vehicle may either be driven purely electromotively or have a hybrid drive, that is to say, in addition to an electric motor, also have an internal combustion engine.

DETAILED DESCRIPTION OF THE INVENTION

Figure 1:
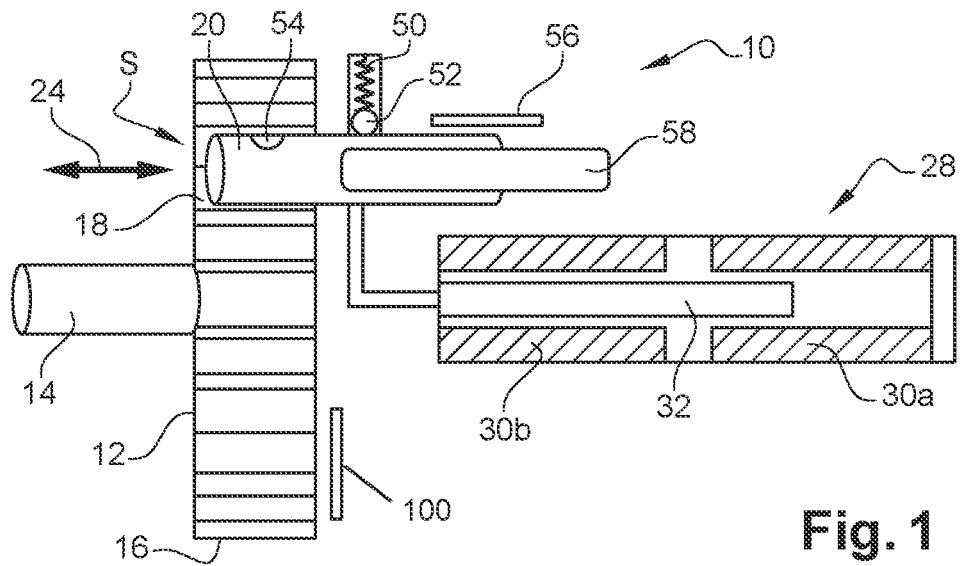
FIG. 1 shows a schematic illustration of a parking lock arrangement according to the invention.

FIG. 1 shows a parking lock arrangement 10 which is intended for installation in a motor vehicle driven by an electric motor. The parking lock arrangement 10 has, in a manner known per se, a parking lock wheel 12 which is arranged in a rotationally conjoint and axially fixed manner on a shaft 14 in the drive train of the motor vehicle. In deviation from the conventional embodiment, the parking lock wheel 12 has between its outer circumference 16 and the shaft 14 multiple cutouts 18, which are formed here by passage bores and are distributed uniformly over the circumference of said parking lock wheel.

For form-fitting arresting of the drive train, the parking lock arrangement 10 comprises a lock element 20, which is formed here by a pin. The lock element 20 is mounted in an actuator housing 22 (illustrated only in FIGS. 2 to 5), which is fixed relative to the chassis of the motor vehicle, so as to be adjustable in a translational manner between a locking position S (FIGS. 1, 4, 5, and 7) and a release position F (FIGS. 2 and 3) along a rectilinear movement path 24 in the direction of the longitudinal extent of said lock element. In the locking position S, the lock element 20 engages in a form-fitting manner into one of the cutouts 18 of the parking lock wheel 12 such that the parking lock wheel 12 and the shaft 14 in the drive train, which is connected rotationally conjointly thereto, and ultimately also the wheels of the motor vehicle, which are operatively connected rotationally conjointly thereto, are prevented from performing a rotational movement. In the release position F, the lock element 20 is in a state fully retracted from the cutouts 18 of the parking lock wheel 12, with the result that said lock element is out of engagement with said cutouts, and that the parking lock wheel 20 and thus also the drive train and the wheels of the motor vehicle that are operatively connected thereto are freely rotatable. A sensor 100 is arranged for position detection of the parking lock wheel 12.

For the purpose of adjusting the lock element 20, provision is also made of an electromagnetic parking lock actuator 26, which comprises here a reversing solenoid 28 having two axially adjacently arranged coils 30a and 30b and having a solenoid plunger 32 which is displaceably received therein.

The two coils 30a and 30b are arranged parallel to (FIG. 1) or coaxially with (FIGS. 2 to 5) the longitudinal extent of the lock element 20, with the result that the solenoid plunger 32 can move back and forth in a rectilinear manner parallel to or coaxially with the lock element 20. The solenoid plunger 32 is connected fixedly to the lock element 20, with the result that, by selective electrical energization of one of the two coils 30a or 30b, the solenoid plunger 32 is drawn into the respective coil 30a or 30b and in the process the lock element 20 is also correspondingly adjusted along its rectilinear movement path 24. The electrical energization of the coils 30a, 30b is realized via a control unit (not illustrated here) of the parking lock arrangement 10.

Figure 2:
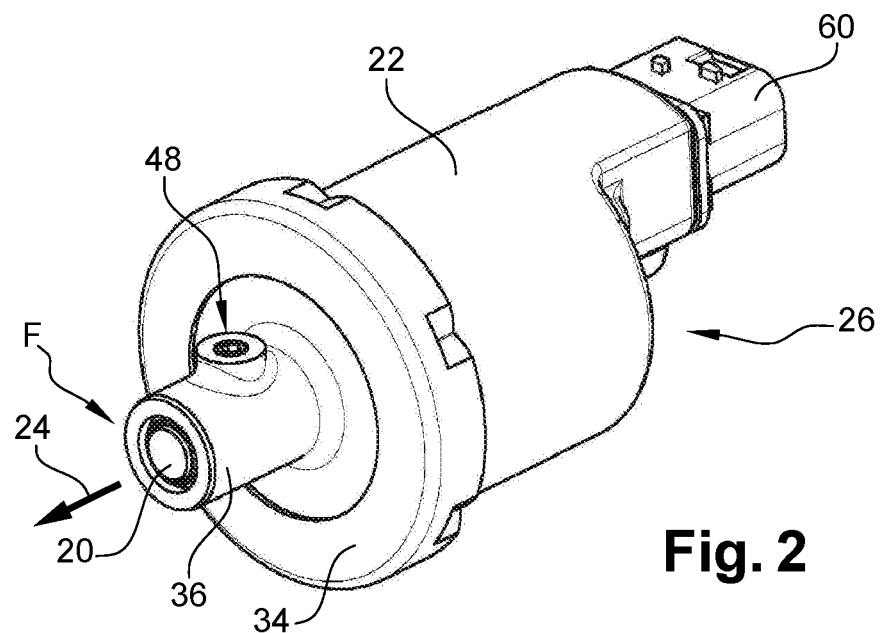
FIG. 2 shows a perspective view of an electromechanical parking lock actuator for a parking lock arrangement according to the invention, wherein the lock element is in the release position.

The parking lock actuator 26 shown in the exemplary embodiment in FIG. 2 comprises an actuator housing 22, which is preferably injection-moulded from a plastic and, via fastening lugs (not illustrated in more detail here), can be fastened in the motor vehicle in a manner known per se, for example by means of screws. At its front side, which is situated on the left in FIGS. 3 and 5, the actuator housing 22 is closed by a housing cover 34 which is manufactured from metal. Integrally formed on the housing cover 34 is a collar 36 having an inner duct, in which the pin 20 forming the lock element is received in an axially displaceable manner. For this purpose, the pin is fastened to the front end of an actuation rod 38 which, by means of two slide bearings 40, is mounted in an axially displaceable manner in the actuator housing 22.

Also in the actuator housing 22, the two coils 30a and 30b of the reversing solenoid 28 are received in in each case one coil carrier 42, which for its part is accommodated in in each case one magnet housing 44, which is of multi-part design here. The solenoid plunger 32, formed by an iron core, of the reversing solenoid 28 is fastened on the actuation rod 38 radially inside the two magnet housings 44. The solenoid plunger 32 is situated axially between the two slide bearings 40, which are attached to the inner side of the two magnet housings 44.

Figure 3:
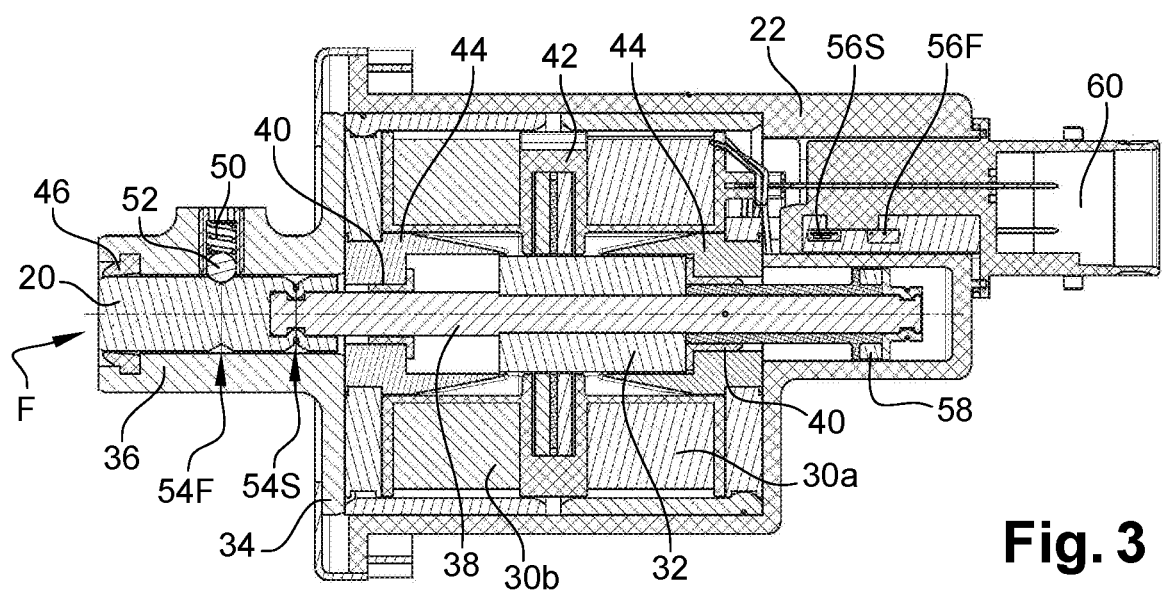
FIG. 3 shows a sectional view of the parking lock actuator from FIG. 2.
Figure 4:
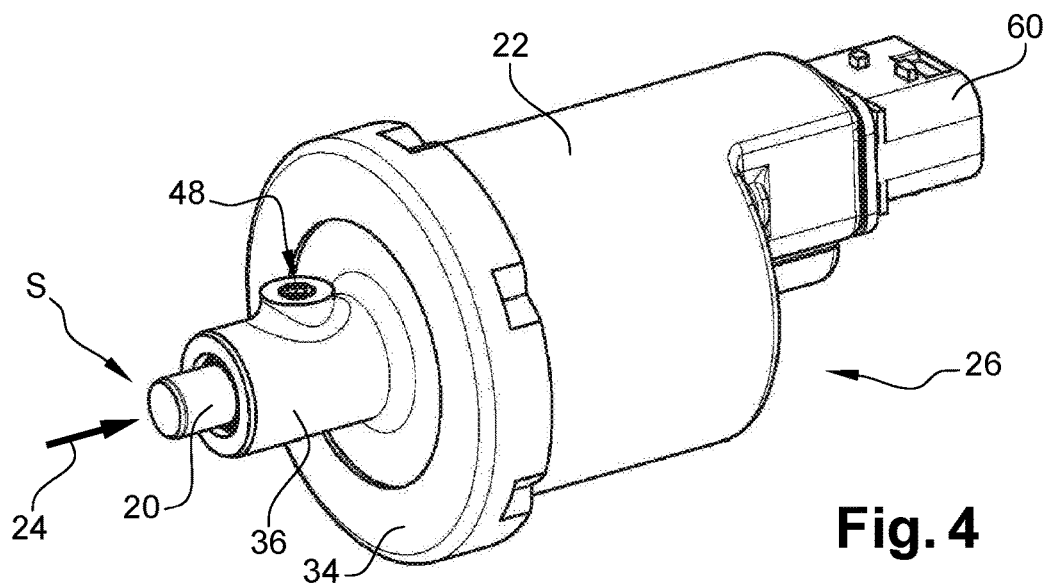
FIG. 4 shows a perspective view of an electromechanical parking lock actuator for a parking lock arrangement according to the invention, wherein the lock element is in the locking position.
Figure 5:
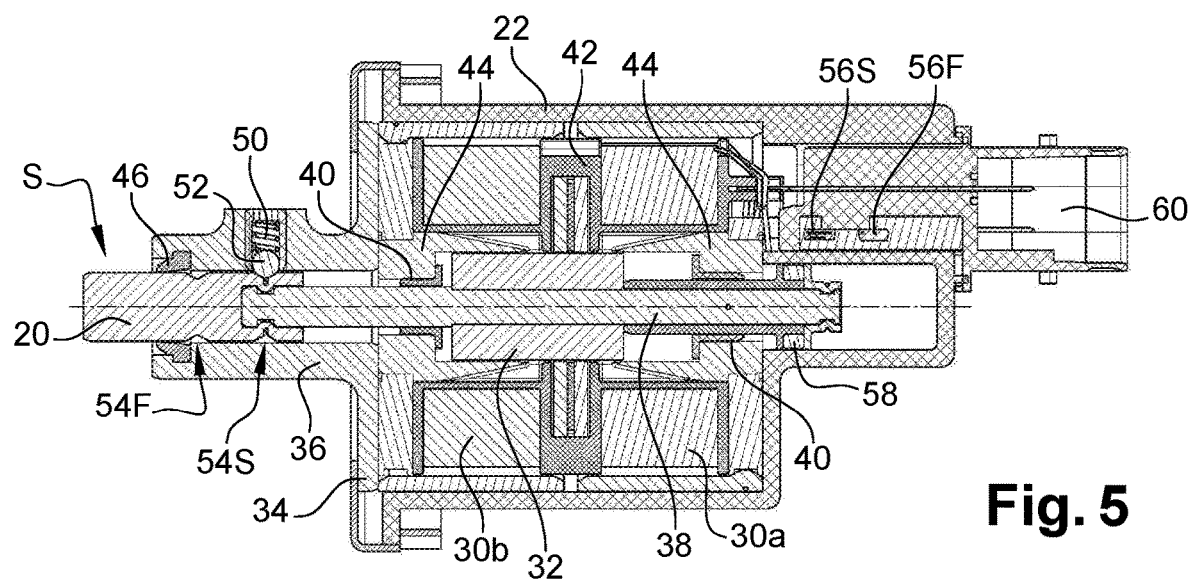
FIG. 5 shows a sectional view of the parking lock actuator from FIG. 4.
Figure 7:
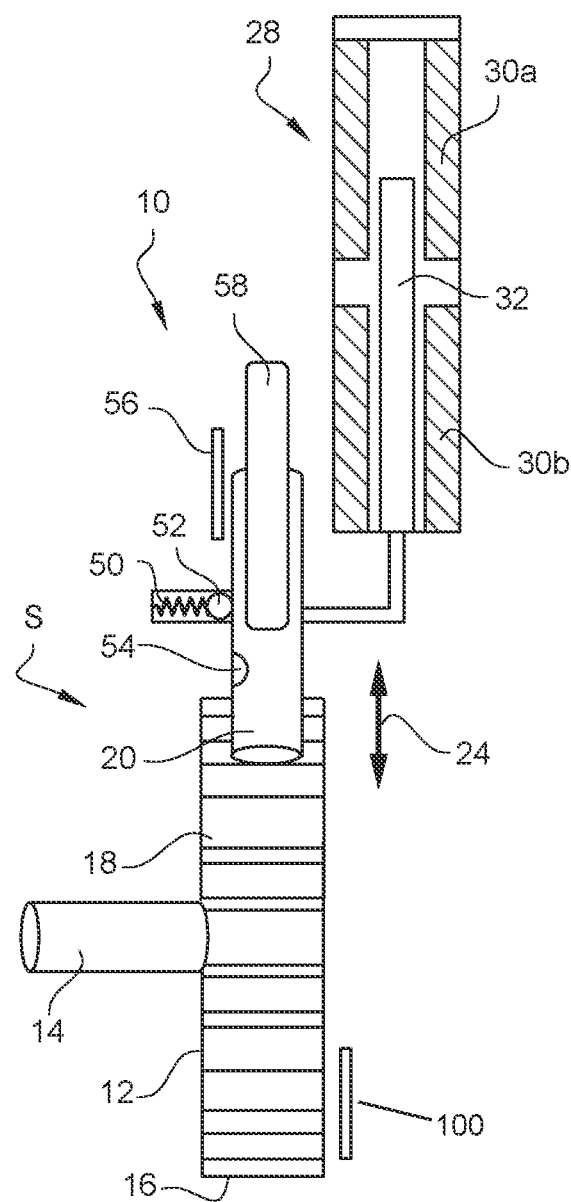
FIG. 7 shows a schematic illustration of a parking lock arrangement according to another embodiment of the invention.

By electrical energization of the rear coil 30a, which is situated on the right in FIGS. 3 and 5, the solenoid plunger 32 and, together therewith, the actuation rod 38 are drawn to the right until the solenoid plunger bears against a shoulder of the rear slide bearing 40, which shoulder forms an axial stop. The pin 16 forming the lock element is then entirely in the duct of the collar 36 in the release position F (FIGS. 2 and 3). A scraper 46 is arranged at the front of the collar 36 and bears with its radially inwardly pointing lip on the pin 16.

If, by contrast, the front coil 30b, which is situated on the left in FIGS. 3 and 5, is electrically energized, the solenoid plunger 32 and, together therewith, the actuation rod 38 are drawn to the left until the solenoid plunger bears against a shoulder of the front slide bearing 40, which shoulder forms an axial stop. In this way, the pin 16 forming the lock element protrudes axially out of the collar 36 (FIGS. 4 and 5), with the result that said pin, in the locking position S, for blocking the drive train, can engage in a form-fitting manner into a cutout 18 of the parking lock wheel 12.

For the purpose of securing the locking position S and the release position F in the case of the coils 30a and 30b not being electrically energized, provision is made of locking means 48 which act in a form-fitting and force-fitting manner on the collar 36. For this purpose, a ball 52 loaded by a compression spring 50 is received in a transverse bore and, in the locking position S and the release position F, engages in a latching manner in in each case one notch 54S or 54F, respectively of the pin 20.

Also arranged in the actuator housing 22 are two magnetically acting position sensors 56S and 56F, which respond to a position magnet 58 fastened on the actuation rod 38. In this way, it is possible to detect whether the pin 16 is in the locking position S or in the release position F.

For the purpose of connecting the coils 30a and 30b of the reversing solenoid 28 and the two position sensors 56 to an external control unit, the parking lock actuator 26 has an common electrical interface 60 integrated into the actuator housing 22, which interface is arranged in the rear region of the actuator housing 22.

Figure 6:
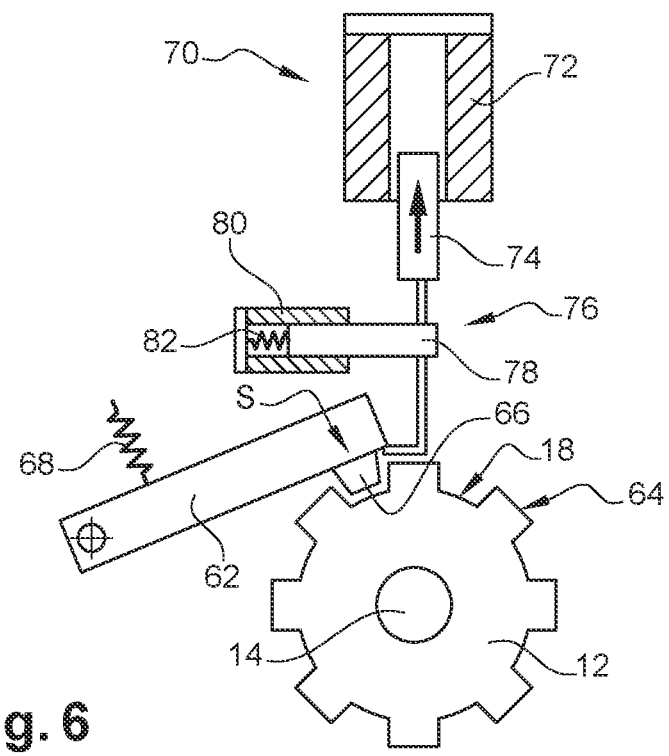
FIG. 6 shows a schematic illustration of a parking lock arrangement not according to the invention.

In the embodiment not according to the invention that is illustrated in FIG. 6, the parking lock arrangement comprises a pivotably mounted pawl 62 and a parking lock wheel 12 which has on the outer circumferential side a toothing 64. The pawl 62 has a locking tooth 66, which forms the lock element 20 and, in the locking position S, in a conventional manner, engages from the outside into a cutout 18 of the parking lock wheel 12 that is formed in the toothing 64. Here, the pawl 62 is preloaded into the locking position S by a spring 68. For the purpose of adjusting the pawl 62 and thus also the lock element 20 into the release position F, a solenoid 70 is arranged as a parking lock actuator. Upon electrical energization of the coil 72 thereof, the solenoid plunger 74 is drawn into the coil 72 and in the process the pawl 62, which is connected thereto, is, counter to the preload force exerted by the spring 68, pivoted to such an extent that the locking tooth 66 is no longer in engagement with the toothing 64 of the parking lock wheel 12.

For the purpose of securing the release position F, provision is made as locking means of an additional electrical locking magnet 76 having a spring-loaded solenoid plunger 78, which blocks the solenoid plunger 74 of the solenoid 70 in its position in which it is drawn into the coil 72. Only by electrical energization of the coil 80 of the locking magnet 76 is the solenoid plunger 78 thereof drawn into the coil 80 counter to the force of the spring 82 acting thereon such that the solenoid plunger 74 of the solenoid 70 is released and the pawl 62, as a consequence of the preload force exerted by the spring 68, pivots back into the locking position.

The invention claimed is:

1. A parking lock arrangement for an electromotively driven motor vehicle, comprising:
    a parking lock wheel which is rotationally conjoint with respect to a shaft in the drive train and which has multiple cutouts,
    a lock element which is movable between a locking position and a release position along a movement path and which, in the locking position, engages in a form-fitting manner into one of the cutouts of the parking lock wheel and, in the release position, is out of engagement with the cutouts of the parking lock wheel,
    a parking lock actuator which is operatively connected to the lock element and by way of which the lock element is adjustable between the locking position and the release position along a movement path of the lock element, the movement of the lock element being rectilinear, the parking lock actuator being an electromagnetic actuator comprising a reversing solenoid acting in both directions and having two axially adjacently situated coils which surround a solenoid plunger connected fixedly to the lock element,
    wherein a sensor is arranged for position detection of the lock element and for the purpose of connecting the coils of the reversing solenoid and the sensor to an external control unit, the parking lock actuator having a common electrical interface.

2. The parking lock arrangement according to claim 1, wherein the lock element is a pin or bar which is mounted in an axially displaceable manner in a frame or housing of the parking lock actuator.

3. The parking lock arrangement according to claim 2, wherein the common electrical interface is integrated in a rear region of the housing of the parking lock actuator.

4. The parking lock arrangement according to claim 1, wherein the cutouts in the parking lock wheel are formed in an axial direction, and wherein the lock element is mounted so as to be displaceable parallel to the axis of rotation of the parking lock wheel and, in the locking position, engages axially into one of the cutouts.

5. The parking lock arrangement according to claim 1, wherein the cutouts in the parking lock wheel are formed in a radial direction, and wherein the lock element is mounted so as to be displaceable perpendicular to the axis of rotation of the parking lock wheel and, in the locking position, engages radially into one of the cutouts.

6. The parking lock arrangement according to claim 1, wherein the lock element is able to be locked in the locking position and in the release position in each case by locking means which act in at least one of a form-fitting and force-fitting manner.

7. The parking lock arrangement according to claim 6, wherein the locking means comprise a locking body which is loaded by a compression spring, in which the locking body, in the locking position and in the release position, engages, in each case in a latching manner, into a cutout, which is connected fixedly to the lock element.

8. The parking lock arrangement according to claim 1, wherein at least one sensor is arranged for position detection of the parking lock wheel.

9. An electromotively driven motor vehicle, comprising a parking lock arrangement according to claim 1.

10. The parking lock arrangement according to claim 1, wherein two magnetically acting position sensors respond to a position magnet fastened on an actuation rod fixedly linked to the plunger and the lock element.

* * * * *